United States Patent [19]

Barrett

[11] Patent Number: 5,594,632

[45] Date of Patent: Jan. 14, 1997

[54] POWER CONVERTER WITH HARMONIC NEUTRALIZATION

[75] Inventor: Alfred H. Barrett, Carmel, Ind.

[73] Assignee: Delco Electronics Corporation, Kokomo, Ind.

[21] Appl. No.: 316,974

[22] Filed: Oct. 3, 1994

[51] Int. Cl.[6] ........................................................ H02M 1/14
[52] U.S. Cl. ................................................................ 363/44
[58] Field of Search .................................... 363/16, 39, 40, 363/44–48

[56] References Cited

U.S. PATENT DOCUMENTS

| Re. 27,916 | 2/1974 | Kakalec | 323/61 |
|---|---|---|---|
| Re. 28,359 | 3/1975 | Hart et al. | 323/56 |
| 2,143,745 | 8/1938 | Sola | 171/119 |
| 2,896,180 | 7/1959 | Brown | 336/155 |
| 2,938,180 | 5/1960 | DeWitz | 333/78 |
| 3,122,699 | 2/1964 | Schohan | 323/83 |
| 3,148,326 | 9/1964 | Baycura et al. | 323/56 |
| 3,253,212 | 5/1966 | Wentworth | 323/56 |
| 3,525,035 | 8/1970 | Kakalec | 323/61 |
| 3,573,605 | 4/1971 | Hart et al. | 323/56 |
| 3,573,606 | 4/1971 | Hart et al. | 323/60 |
| 3,965,408 | 6/1976 | Higuchi et al. | 321/25 |
| 4,143,414 | 3/1979 | Brewster et al. | 363/44 |
| 4,340,931 | 6/1982 | Endo et al. | 363/44 |
| 4,730,243 | 3/1988 | Glennnon | 363/44 |
| 4,831,508 | 5/1989 | Huner | 363/44 |

*Primary Examiner*—Matthew V. Nguyen
*Attorney, Agent, or Firm*—Mark A. Navarre

[57] ABSTRACT

An AC/DC harmonic neutralizing power converter. The power converter includes a first rectifier, load output terminals for delivering DC power to a load, and a harmonic neutralizing converter. The first rectifier includes an input to receive AC input power and an output. The harmonic neutralizing converter comprises a power switching inverter and a second rectifier. The power switching inverter includes an input connected to the output of the first rectifier, an LC resonant circuit, and an output. The second rectifier of the harmonic neutralizing converter has an input connected to the output of the inverter and an output connected in voltage additive relationship to the output of the first rectifier. The added outputs of the rectifiers is connected to the load output terminals such that the output voltage on the load output terminals substantially equals the added output voltages of the rectifiers. In this manner, the power converter draws from the power source substantially sinusoidal current of a frequency substantially equal to the frequency of the input signal provided by the AC power source. Various embodiments are also illustrated in which the power converter is controlled without modifying the operating frequency of the resonant circuit of the power switching circuit. This may be accomplished by inclusion of an additional output stage, a bootstrap circuit, and use of a controlled-K resonant transformer in the series resonant circuit. By using series resonant topology within the harmonic neutralizing power converter, harmonic neutralization is accomplished using a topology which is inherently advantageous over pulse width modulation power converters.

18 Claims, 13 Drawing Sheets

Harmonic Neutralization with 2-Step Load Line

Harmonic Neutralization with 4-Step Load Line

POWER CONVERTER WITH HARMONIC NEUTRALIZATION

BACKGROUND OF THE INVENTION

1. Field of the Invention

The present invention relates to AC-DC power converters, and, more particularly, to the provision of a resonant power converter having harmonic neutralization that has application in battery chargers and power supplies for automotive, industrial, and a variety of consumer applications.

2. Description of the Related Art

Some electric loads cause the generation of harmonic currents on the power supply to which these loads are connected. These harmonic currents are undesirable as they cause non-optimal use of the power source by the loads. As a consequence, some European countries have imposed stringent requirements for the elimination of such harmonics, referred to herein as "harmonic neutralization", through the standard known as IEC 555-2. Other countries are contemplating the requirement for harmonic neutralization.

Certain types of electrical loads, such as electrical heating units, are inherently free from the generation of harmonic currents while others, such as power supply type loads, normally produce large harmonics of current. For example, when an ordinary AC input power converter is operated from the power source provided by the electric utility service, the power converter is likely to produce harmonic current. Specifically, though the power source has a sinusoidal voltage, such as the 60 Hz power source provided in the United States, the power converter connected to the sinusoidal voltage power source draws non-sinusoidal current. The current drawn by the power converter often has a distortion content which ranges from 25 to 150% thereby creating low-frequency conducted interference and unduly taxing the current supplying capacity of the power source.

When a power converter includes harmonic neutralization, the power converter ideally draws sinusoidal current from the sinusoidal voltage power source. The harmonic neutralizing power converter does not create low-frequency conducted interference, and, if the converter's input current is in phase with its input voltage, the converter provides optimum utilization of the power source. Under these circumstances, the power converter looks like a linear resistive load to the power source and the power factor of the converter is unity—the optimum.

The employment of harmonic neutralization is well known in the art in switchmode, i.e., in pulse-width modulation (PWM), power supplies. Several circuit topologies exist which, when used with PWM and suitable control loops, meet current harmonic neutralization standards. Some of the these topologies support outputs of several hundred watts. Industrial loads, ranging up to and beyond a kilowatt and which normally generate large harmonic currents, are sometimes supplied by power conditioning equipment employing active and/or passive harmonic neutralization circuits to meet harmonic neutralization standards. However, the use of PWM to achieve harmonic neutralization is limited from an implementation viewpoint in many respects. First, power converters using PWM for harmonic neutralization are costly to manufacture, usually require additional control of electromagnetic interference (EMI), are of significant size and weight, operate inefficiently at high frequencies, and adapt poorly to induction coupling. Induction coupling is desirable in some applications, such as in providing for easier, safer, and more reliable battery charging.

The likelihood of the imposition of harmonic neutralization standards as in the United States and the retention of existing standards as in Europe makes it desirable to develop a power converter which does not possess the aforementioned limitations of PWM power supplies.

Resonant converters are advantageous over switchmode (PWM) converters for several reasons which are discussed hereinafter. Therefore, resonant converters may serve as a viable alternative to PWM converters if harmonic neutralization can be achieved with resonant converter topology. Though the basic concepts involving resonance in electrical circuits were developed during the early days of the development of radio technology over fifty years ago, the evolution of resonant technology has been generally limited to the resolution of specific problems, e.g. the commutation of silicon controlled rectifiers (SCRs). A brief look at the history of power supplies is instructional when comparing PWM converters to resonant converters.

Early power supplies often used a line frequency power transformer and a linear regulator consisting of vacuum tubes or, in later supplies, power transistors. These early power supplies were generally large, heavy and inefficient. DC-DC type power supplies used mechanical vibrators, vacuum tubes or switching power transistors to accomplish inversion (DC to AC transformation) when isolation or a significant voltage transformation was required. When vacuum tubes or switching transistors were employed, the regulation function of the power supply was often accomplished by PWM or by pulse-frequency modulation. The introduction of silicon power transistors, which were capable of dissipating several hundred watts and switching in a few microseconds, had an impact on the popularity of PWM for regulation. Today, PWM still prevails as the means for regulating a vast majority of commercially available power supplies.

The availability of high speed silicon power transistors resulted in the emergence of PWM power supplies having increasingly higher feasible power levels. However, these power supplies were generally limited to only a few kilowatts. In the late 1960's the SCR became available for use in operation at several kilowatts and above. However, because the SCR has no means by which it can interrupt its own current flow, i.e., self-commutate, forced commutation was necessary for the SCR to operate in DC systems. The need for forced commutation prompted the development of resonant circuits in which ringing is used to produce a reversal in current flow. Similarly, since the mid-1980's, resonant power technology is utilized with increased frequency in power circuits due to the introduction of other switching devices such as bipolar transistors, MOSFETs, IGBTs, etc. Though these devices, unlike SCRs, do not necessarily require the use of resonance for commutation, resonance can be employed where it is advantageous over PWM, such as at high operating frequencies.

When operated at the resonant frequency of its tank circuit (as used herein, the term "tank" refers to the combination of a transformer or inductor and the resonant capacitor connected thereto), the series resonant converter has a pure sine wave of tank current at that frequency. Therefore, at the time the square wave of excitation voltage produces a voltage transition on its power switching devices, series resonant converters are not necessarily conducting current. Low switching losses are produced in these devices when the current is zero. Thus this condition, commonly referred to as zero-current switching, is desirable. With series resonant converters the dominant loss is conduction loss. However, conduction losses are not strongly related to operating frequency and, therefore, the series resonant converter can operate efficiently at a high frequency. For example, a resonant converter can be designed to operate efficiently at a frequency that is typically five to ten times higher than a PWM converter of the same power level using the same power switching devices.

A resonant converter is further advantageous as it produces little electromagnetic interference (EMI). Because a resonant converter develops a sinusoid of current, as opposed to a fast rising quasi-square wave, little EMI is produced. Further, the components of the resonant converter are generally fewer in number and less costly than the components required for PWM. The resonant converter's components are also of a smaller volume and weight thereby permitting applicability of the converter in a smaller or more weight sensitive environment than is possible with PWM. It is therefore desired to provide a power converter having harmonic neutralization which uses resonant power technology to gain the advantages inherently provided by resonant converters.

As previously mentioned, resonant converters are known to be advantageous for having low switching loss. However, there are problems associated with the use of resonant converters that should be considered. For example, switching losses may be created when the output of the resonant converter is controlled over a wide range. Specifically, the output voltage or current of a resonant converter is typically controlled by changing its operating frequency over a range of frequencies above or below the converter's resonant frequency. When the operating frequency is above or below the resonant frequency, the tank current is out of phase with the excitation voltage. Generally, this phase difference creates switching loss and may increase EMI as well. Specifically, such losses may occur over an operating frequency range which extends from several times the resonant frequency down to one-half (½) the resonant frequency.

Another problem occurs when the operating frequency is close to the resonant frequency. In such a situation, the voltage or current in the tank components is strongly related to the Q of the circuit. Thus, the control curves are highly nonlinear and strongly affected by the load. Therefore, it is desired to provide a controlled power converter using resonant power technology and having harmonic neutralization which avoids the problems encountered when the converter is controlled by changes to the converter's operating frequency.

Yet another potential problem associated with the resonant converter is the conductive losses that may be generated. A resonant converter may have significantly higher conduction loss than is generated with a PWM converter. However, if the switching losses of the resonant converter is minimized as described hereinabove, the resonant converter can still incur lower loss than the PWM converter. Thus, the resonant converter's conductive losses do not preclude its desirability over the use of PWM converters.

As previously stated, the problem of switching loss for a resonant converter can be eliminated when the series resonant converter operates at a frequency below one-half of its resonant frequency. If the controlled switches of the resonant converter are turned off prior to the initiation of a second cycle of ringing, current in the tank circuit ceases to flow. This mode of operation of a resonant converter is referred to herein as the "discontinuous current mode of operation". When in the discontinuous current mode of operation, the resonant converter can have a constant on-time drive.

A series resonant converter not only has low switching loss in all of its switching components if operated at and/or below one-half of its resonant frequency, but is also advantageous over other resonant converters due to its low component count. Further, over an operating frequency range from zero to one-half of its resonant frequency, a series resonant converter's output current is nearly linearly proportional to its operating frequency, the tank current waveform is nearly independent of the repetition rate, and the average current output is proportional to the repetition rate.

When operating in the discontinuous current mode, the output current of a series resonant converter is quite independent of its output voltage. Specifically, from zero output voltage to an output voltage at which the input/output voltage transformation ratio is approximately unity (1.0), the output current of a series resonant converter operating in discontinuous current mode is nearly constant. At output voltages reaching a voltage transformation ratio of unity, the output current falls off rapidly as the output voltage exceeds the tank excitation voltage and the tank becomes unloaded. In addition to the provision of an essentially constant output current, the series resonant converter tolerates any passive load and needs no protection circuitry to limit its output voltage or current. Therefore, it is desirable to employ a series resonant converter topology for a power converter having harmonic neutralization to utilize the aforementioned advantages inherently provided with series resonant converters.

A series resonant topology is utilized in an AC to DC converter in U.S. Pat. No. 4,143,414 to result in a reduction in harmonic current distortion. Each phase of the three-phase AC source is first rectified by a full-wave bridge rectifier to convert the AC phase voltage to a rectified DC voltage. Each DC voltage is in turn provided to a resonant bridge inverter to invert the DC voltage to an AC voltage. Then, the AC voltage is converted by another full-wave rectifier to a full-wave rectified DC voltage. The combination of the series resonant bridge inverter and the second full-wave bridge rectifier behaves somewhat like a resistive load for the first full-wave rectifier to reduce the harmonic current distortion produced in the three-phase AC voltage source. However, though a reduction in harmonic distortion occurs, current harmonics are generated in each phase of the three-phase source because the DC to DC rectifiers (the combination of the series resonant bridge inverter and the second full-wave bridge rectifier) are non-linear and do not present an ideally resistive load. As a consequence, additional circuitry is used in the converter of U.S. Pat. No. 4,143,414 to eliminate the harmonic current generated by the DC to DC rectifiers.

Therefore, it is desired to develop a harmonic neutralizing power converter using series resonant topology which requires a minimal number of components to achieve neutralization and which does not generate its own harmonics which must be eliminated through the use of additional circuitry. Further, as previously discussed, it is desired that control of the converter be accomplished by means other than modulation of the operating frequency of the series resonant converter.

SUMMARY OF THE INVENTION

The present invention provides a harmonic neutralizing power converter. The power converter employs series resonant topology to capitalize on the inherent advantage of such topology over pulse-width modulation converters. Further, regulation of the harmonic neutralizing power converter is achieved without adjusting the operating frequency of the resonant converter.

The invention comprises, in one form thereof, an AC to DC power converter. The power converter includes a first rectifier having an input to receive AC input power and an output. The power converter also includes load output terminals for delivering DC power to a load, and a harmonic neutralizing converter. The harmonic neutralizing converter comprises a power switching inverter and a second rectifier. The power switching inverter of the harmonic neutralizing converter has an input connected to the output of the first rectifier, includes an LC resonant circuit, and has an output. The second rectifier of the harmonic neutralizing converter has an input connected to the output of the inverter and output connected in voltage additive relationship to the output of the first rectifier. The added outputs of the rectifiers is connected to the load output terminals. In this manner, the output voltage on the load output terminals substantially equals the added output voltages of the rectifiers.

In one embodiment, the LC resonant circuit of the harmonic neutralizing converter is a series resonant circuit. Use of series resonant technology is advantageous over pulse-width modulation for a multiplicity of reasons including lower switching losses, generation of little EMI, minimization of the number of high power components required for power conversion, and generation of an output current which is nearly proportional to the load voltage.

Three embodiments of the neutralizing converter of the present invention utilize a LC resonant circuit in which the operating frequency of the transformer remains constant, yet a quasi-linear voltage-current load line of the converter is achieved. In one embodiment, the transformer of the series resonant circuit comprises a controlled-K transformer wherein the coupling (K) of the transformer is controlled. In another embodiment, the power converter further comprises an additional output stage for creating a stepped approximation of a linear voltage current load line. In yet another embodiment, a bootstrapping circuit is provided for approximating the load line. By providing control by means other than adjustment of the operating frequency of the series resonant circuit's transformer (inductor), harmonic neutralization is achieved without the introduction of significant switching losses or EMI that may be increased by the control of the operating frequency of a resonant converter.

An advantage of the present invention is the provision of a power converter having harmonic neutralization using resonant converter topology to thereby gain several advantages over the use of PWM topology.

Another advantage is the provision of a harmonic neutralizing power converter having little or no switching losses.

Yet another advantage of the present invention is the provision of a harmonic neutralizing power converter which produces little EMI.

Still another advantage is the provision of a harmonic neutralizing power converter using few high power components to thereby minimize the volume and weight of the converter.

Another advantage of the present invention is the provision of a power converter having harmonic neutralization using series resonant converter topology to capitalize on the nearly constant output current, independent of load voltage, generated by series resonant converters.

Yet another advantage of the present invention is the provision of a harmonic neutralizing power converter including series resonant topology wherein the output is not regulated by the adjustment of the operating frequency of the series resonant topology to avoid the problems of switching loss, generation of EMI, and nonlinearity of the control curves which may be caused by such regulation.

Still another advantage of the present invention is the provision of a harmonic neutralizing series resonant power converter which does not produce current harmonics in the source.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
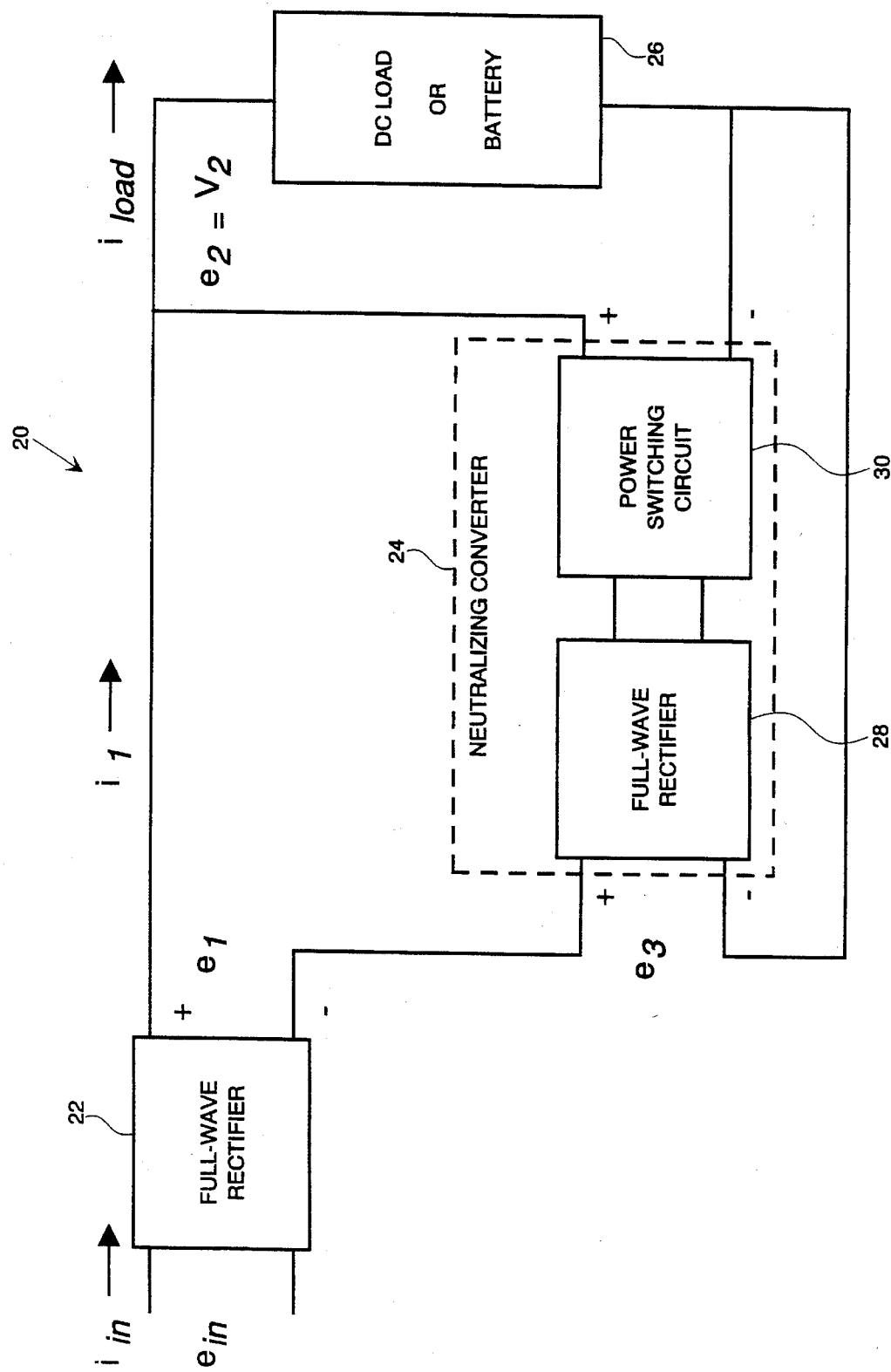
FIG. 1 is a block diagram of the harmonic neutralizing power converter of the present invention.
Figure 5:
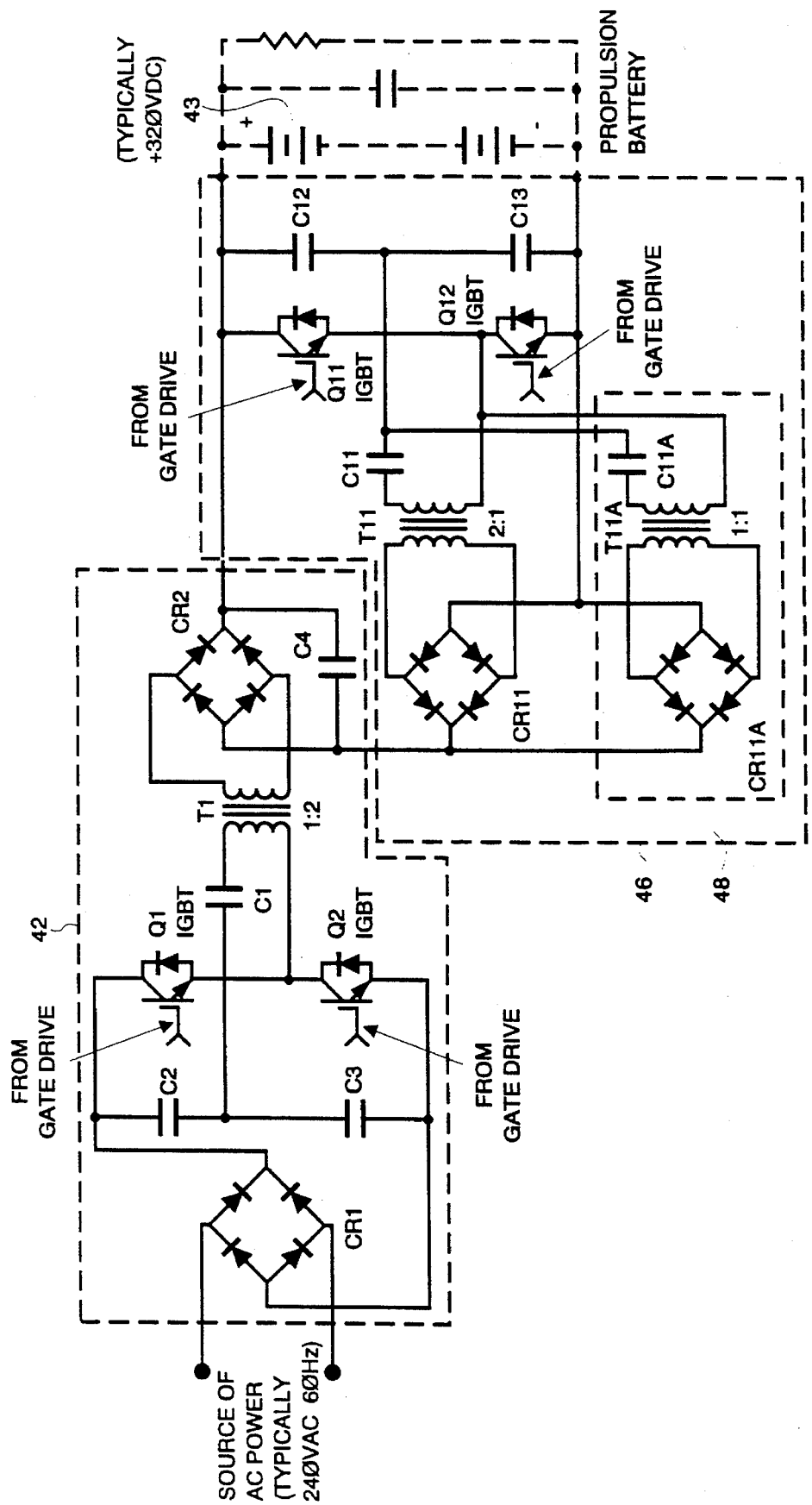
FIG. 5 is a schematic diagram of a battery charger circuit using a second embodiment of the harmonic neutralizing power converter of the present invention in which the converter includes a second output stage.
Figure 6:
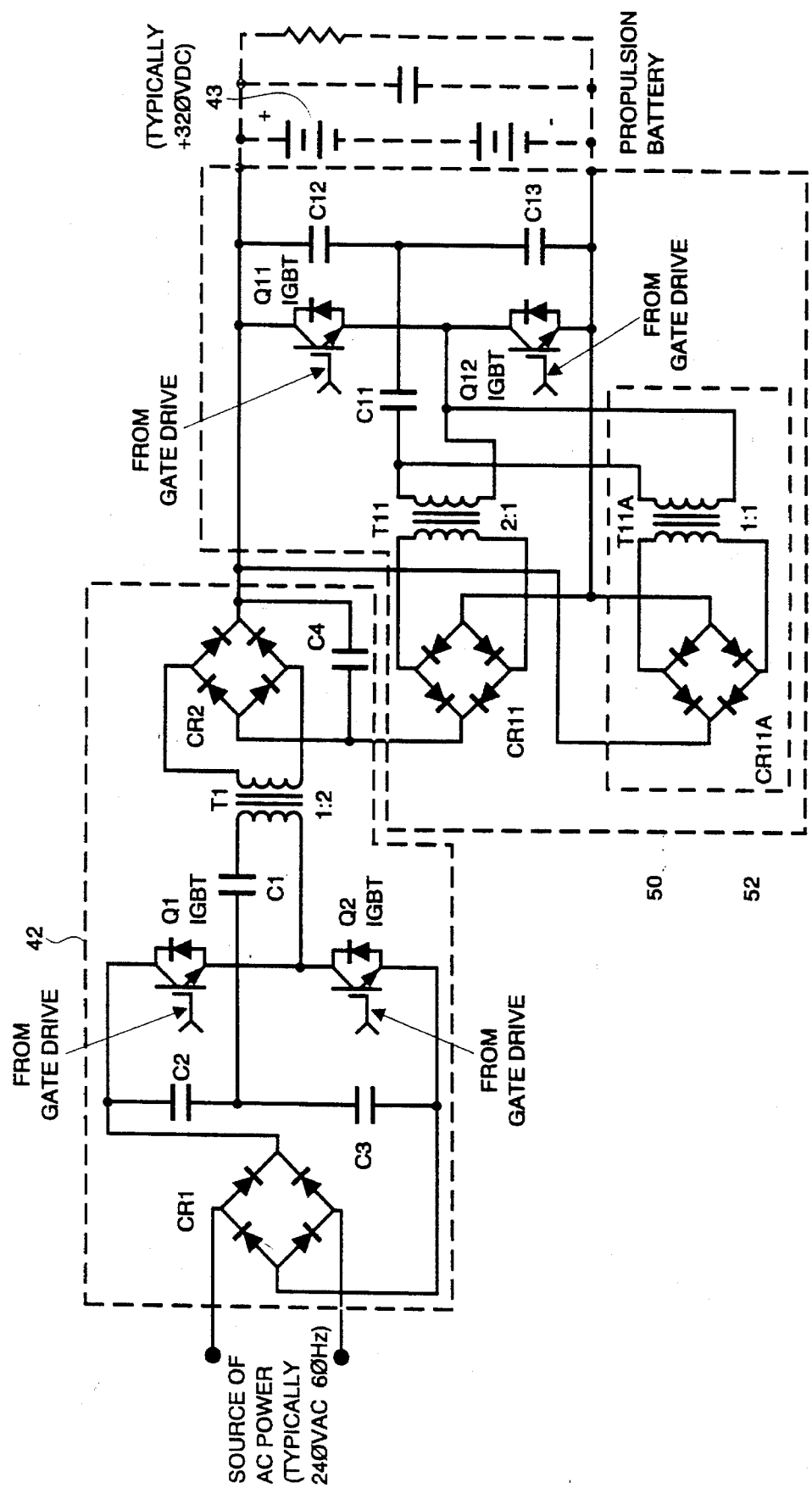
FIG. 6 is a schematic diagram of a battery charger circuit using a third embodiment of the harmonic neutralizing power converter of the present invention in which current is bootstrapped back to input of the converter.
Figure 7:
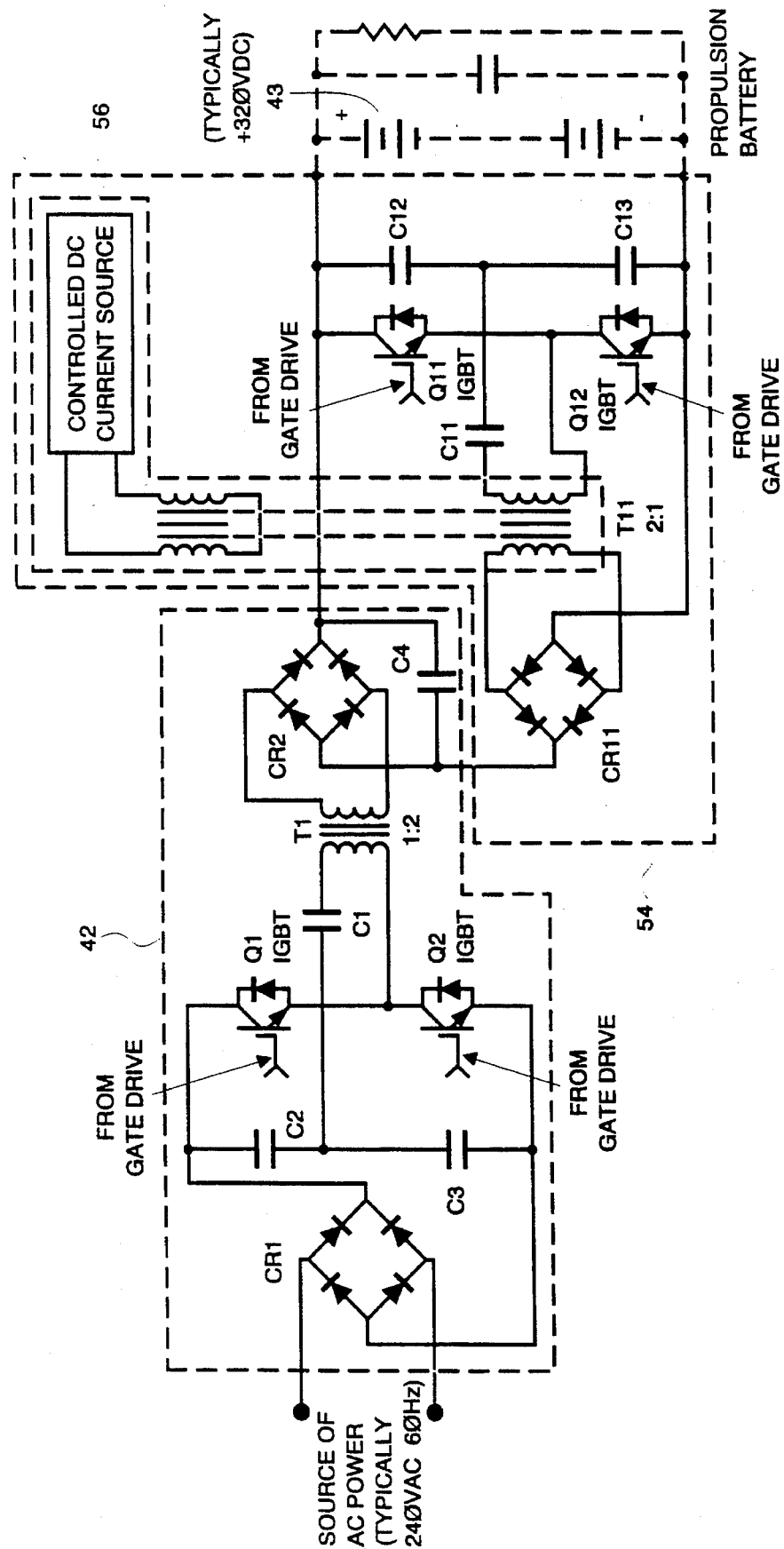
FIG. 7 is a schematic diagram of a battery charger circuit using a fourth embodiment of the harmonic neutralizing power converter of the present invention in which a controlled-K resonating transformer is used to achieve harmonic neutralization.

Referring now to the drawings and particularly to FIG. 1, there is shown a block diagram of the power converter of the present invention having harmonic neutralization. AC/DC converter circuit 20 comprises first full-wave rectifier 22, neutralizing converter 24, and load 26. First rectifier 22 includes an input for receipt of AC input power and an output. Load 26 may comprise a battery, for example, if AC/DC converter circuit 20 comprises a battery charger circuit. Neutralizing converter 24 includes second full-wave rectifier 28 and power switching inverter circuit 30. As is explained in greater detail hereinafter, the output voltage of neutralizing converter 24 is added to the output voltage of first rectifier 22 to equal the voltage of load 26. Specifically, power switching circuit 30 has an input connected to the output of first rectifier 22. Second rectifier 28 has an input connected to the output of power switching circuit 30, and an output connected in voltage additive relationship to the output of first rectifier 22. The added outputs of first and second rectifiers 22 and 28 are connected to the load output terminals of load 26. In this manner the output voltage on the load terminals of load 26 is substantially equal to the sum of the output voltages of both first rectifier 22 and second rectifier 28. Also, power switching circuit 30 of neutralizing converter 24 comprises an LC resonant converter. Use of a resonant converter allows the operating load line to be optimized for harmonic reduction. In fact, satisfactory harmonic reduction may be accomplished without loop control, i.e. with operation of the resonant converter at a fixed frequency as is illustrated in the embodiments of FIGS. 5–7.

Before considering the various embodiments of neutralizing converter 24 disclosed herein, it is useful to discuss the theoretical operation of AC/DC converter circuit 20 of FIG. 1. For perfect harmonic neutralization to be achieved, no current harmonics of the power source frequency are generated and the input current to the converter is not phase shifted from the input voltage—the power factor (PF) is unity and optimum.

For power supplied to first full-wave rectifier 22, input voltage, $e_{in}$, and input current, $i_{in}$, are:

$$e_{in} = V_1 * \sin(2 * pi * f * t) \quad (1)$$

$$I_{in} = I_1 * \sin(2 * pi * f * t) * \cos(\text{theta}) \quad (2)$$

where $V_1$ is a constant equal to the peak valve of the input voltage sinusoid, f is the frequency of the input power (for example, 60 Hz), t is time, $I_1$ is a constant equal to the peak value of the input current sinusoid, and theta is the power factor angle. If neutralizing converter 24 provides perfect harmonic neutralization then theta is zero and input current, $i_{in}$, becomes:

$$i_{in} = I_1 * \sin(2 * pi * f * t) \quad (3)$$

Assuming that the rectifying process of first full-wave rectifier 22 is perfect, the output voltage from first rectifier 22, $e_1$, and the output current from first rectifier 22, $i_1$, are:

$$e_1 = V_1 * |F(t)| \quad (4)$$

$$i_1 = I_1 * |F(t)| \quad (A) \quad (5)$$

where $|F(t)|$ is the waveform resulting from first rectifier 22, and $|F(t)|$ is equal to $|\sin(2 * pi * f * t)|$.

If one assumes that load voltage, $e_2$, is pure DC, then $$e_2 = V_2 = e_1 + e_3 \quad (6)$$

where $e_3$ is the input voltage to neutralizing converter 24 and $V_2$ is a constant equal to the output voltage. Therefore, $$e_3 = V_2 - V_1 * |F(t)| \quad (B) \quad (7)$$

Assuming that first and second rectifiers 22 and 28 and power switching circuit 30 are lossless, then the input power, $P_{in}$, and the output power, $P_{out}$, are:

$$P_{in} = e_{in} * i_{in} = [V_1 * F(t)] * [I_1 * F(t)] \quad (8)$$

$$P_{out} = V_2 * [I_2 * F^2(t)] \quad (9)$$

Note that input power, $P_{in}$, is a sine-squared function of time. Because neutralizing converter 24 has no energy storage capacity, output power, $P_{out}$, must also be, and is, a sine-squared function of time.

The output power of neutralizing converter 24, $PC_{out}$, is:

$$PC_{out} = e_3 * i_1 = [V_2 - V_1 * |F(t)|] * [I_1 * |F(t)|] \quad (10)$$

$$PC_{out} = [V_2 * I_1 * |F(t)|] - [V_1 * I_1 * F^2(t)] \quad (11)$$

Though $V_2$ may be less than $V_1$, this requires that the neutralizing converter have bidirectional capability. To avoid complexity, such a bidirectional capability is not considered herein. Thus, $V_2$ is greater than or equal to $V_1$. If $V_2$ equals $V_1$, then $$PC_{out} = [V_1 * I_1 * |F(t)|] - [V_1 * I_1 * F^2(t)] \quad (12)$$

$$i_{load} = I_1 * F^2(t) \quad (13)$$

If $V_2$ is greater than $V_1$, then $$PC_{out} = [V_2 * I_1 * |F(t)|] - [V_1 * I_1 * F^2(t)] \quad (14)$$

$$i_{load} = I_2 * F^2(t) = (V_1/V_2) * I_1 * F^2(t) \quad (15)$$

The average handling capacity of neutralizing converter 24, $PC_{avg}$, determined by integrating equation (15) from t=0 to T=1/(2*f) is $$PC_{avg} = [2 * V_2 * i_1/pi] - [V_1 * I_1/2] \quad (16)$$

$$PC_{avg} = V_1 * I_1 * (0.637 \, V_2/V_1) - 0.5) \quad (17)$$

The handling capacity of neutralizing converter 24 expressed in terms of per unit of power delivered to the load, $PC_{pu}$, is $$PC_{pu} = (1.273 * V_2/V_1) - 1$$

Thus, where $V_2 = V_1$, $PC_{pu} = 0.273$ meaning that neutralizing converter 24 handles less than 100% of the output power or, more specifically, approximately 27.3% of the output power.

To determine the load line requirements for neutralizing converter 24, determine the relationship between $e_3$ and $i_1$. Combining equations (A) and (B) above, $$e_3 = V_2 - (V_1 * i_1/I_1)$$

Figure 2B:
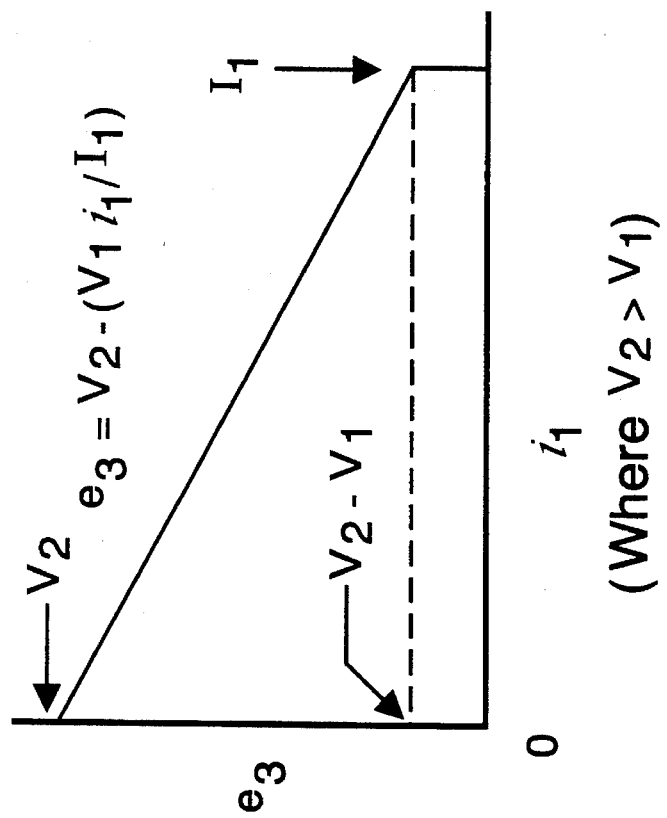
FIGS. 2A and 2B are graphs of the load line of the ideal harmonic neutralizing converter of the present invention under conditions in which the output voltage is equal to the peak of the input voltage sinusoid and greater than the peak of the input voltage sinusoid, respectively.
Figure 2A:
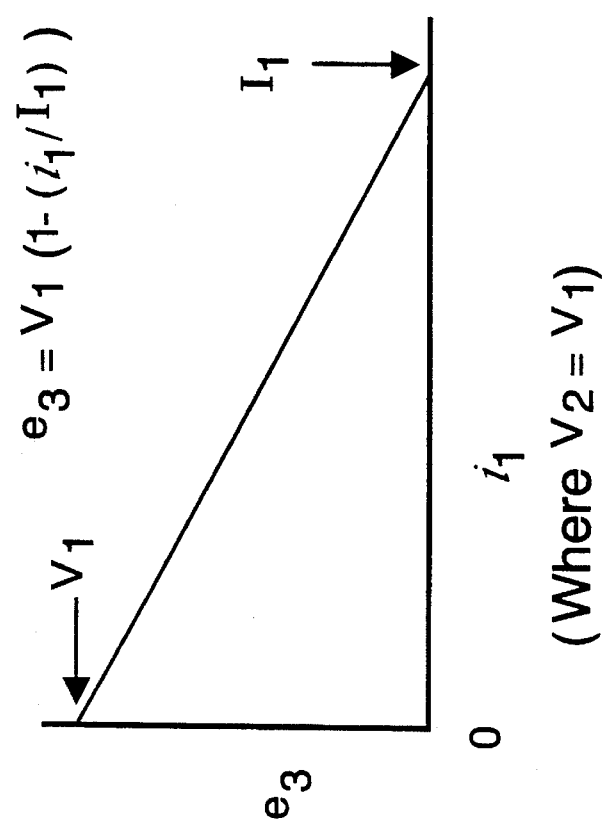

As expected, there is a linear relationship between output voltage $V_2$ and output current of neutralizing converter 24. This linear voltage-current load line relationship is illustrated in FIGS. 2A–2B. In FIG. 2A, $V_2$ is equal to $V_1$. In FIG. 2B, $V_2$ is greater than $V_1$.

Figure 3:
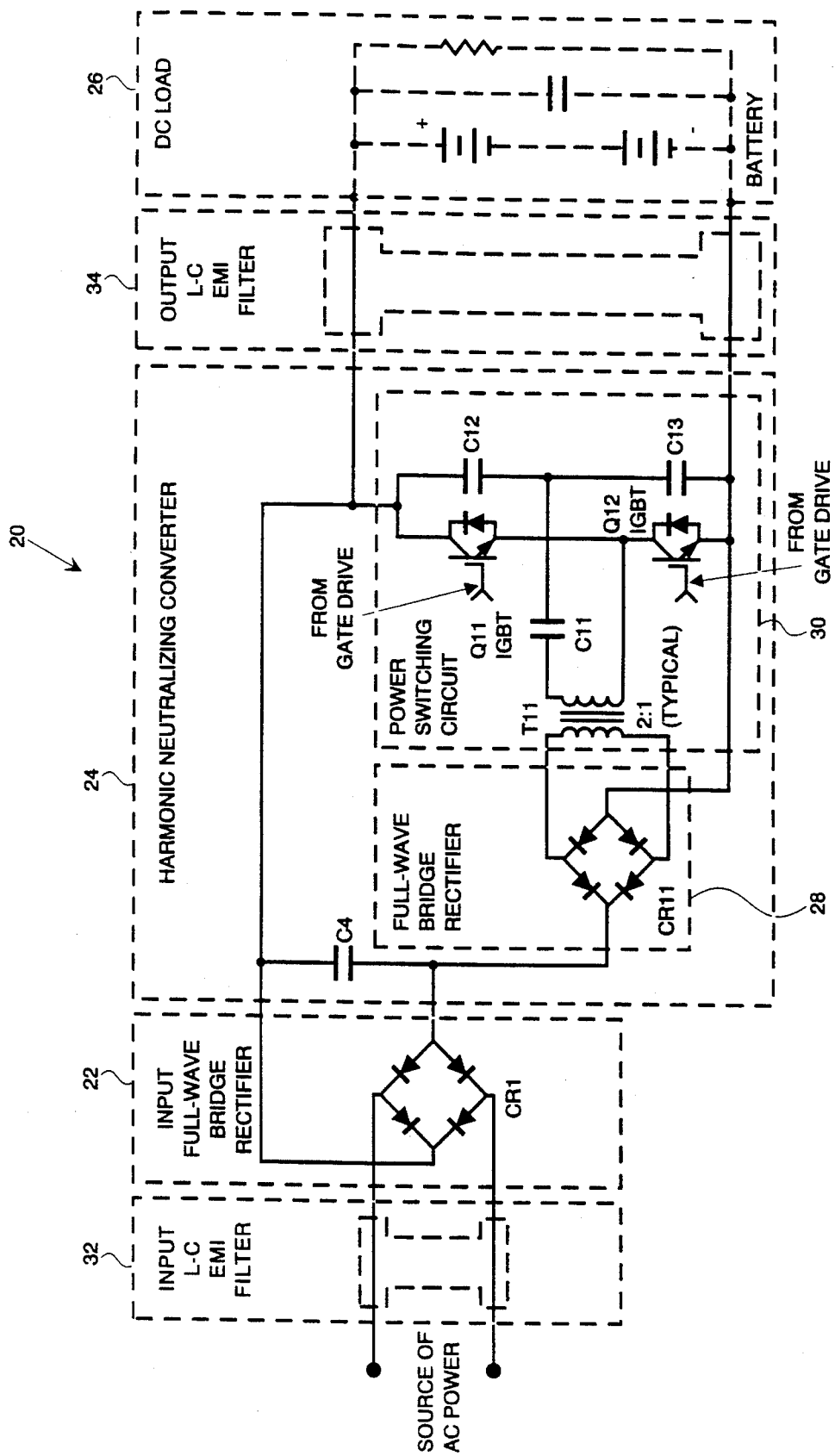
FIG. 3 is a schematic diagram of one embodiment of an AC/DC power converter with harmonic neutralization according to the present invention.

Referring now to FIG. 3, there is shown a schematic diagram of one embodiment of an AC/DC power converter with harmonic neutralization according to the present invention. In this embodiment, AC/DC converter circuit 20 includes first full-wave bridge rectifier 22, harmonic neutralization circuit 24 and load 26, as previously described in the description of the embodiment of FIG. 1. AC/DC converter circuit 20 also comprises input filter 32 and output filter 34. Input power, typically from a 50 Hz or 60 Hz utility source, first flows through input filter 32 which reduces conducted common mode and conducted differential mode interference. The AC output from input filter 32 is then rectified by first full-wave bridge rectifier 22 (CR1) and filtered with a small amount of capacitance via C4 of neutralizing converter 24 to produce low impedance for the output current of neutralizing converter 24 and to filter the output current of neutralizing converter 24. Capacitor C4 is not intended to filter the low frequency pulsating DC from first rectifier 22.

Neutralizing converter 24 is connected to first rectifier 22 and load 26 so that the output voltage of neutralizing converter 24 is added to the output voltage of first rectifier 22 before reaching load 26. In this embodiment, AC/DC converter 20 also includes output filter 34 disposed between the output of neutralizing converter 24 and the input of load 26. Output filter 34, like input filter 32, is also intended to reduce interference of the output of neutralizing converter 24.

The load for neutralizing converter 24 is required to have energy storage capacity. Thus, in this embodiment, load 26 comprises a battery. Alternatively, the load may include a large amount of capacitance, for example. For neutralizing converter 24 to deliver output power to load 26, the source of power is to provide power to neutralizing converter 24 through first rectifier 22 at all points in the AC cycle. Further, though the input AC power fluctuates between a maximum value at the peak of each sinusoidal cycle and a zero valve at zero crossing, the voltage across load 26 must remain nearly constant. Therefore, load 26 cyclically behaves as a power source for neutralizing converter 24 keeping the input voltage of neutralizing converter 24 nearly constant.

Figure 8:
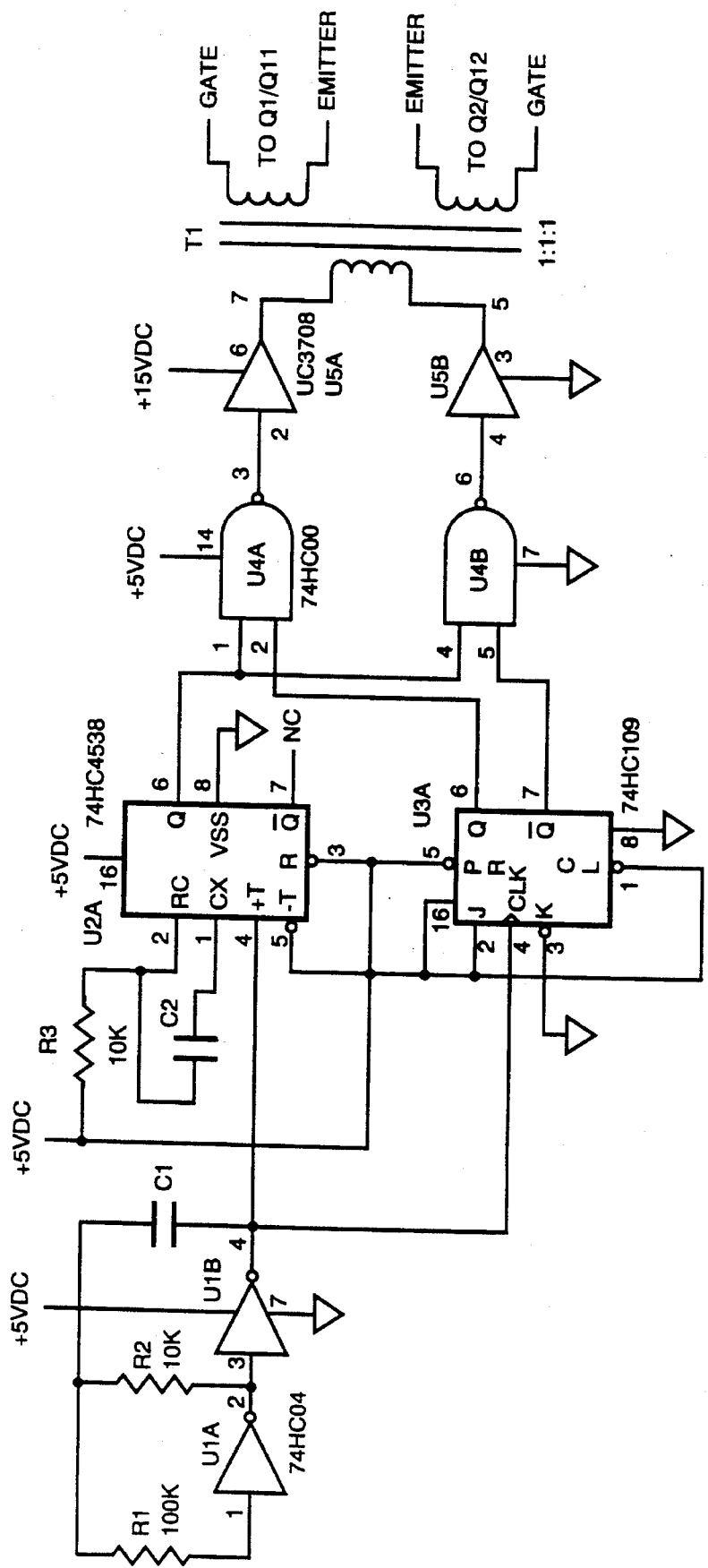
FIG. 8 is a schematic of a fixed frequency gate drive.
Figure 9:
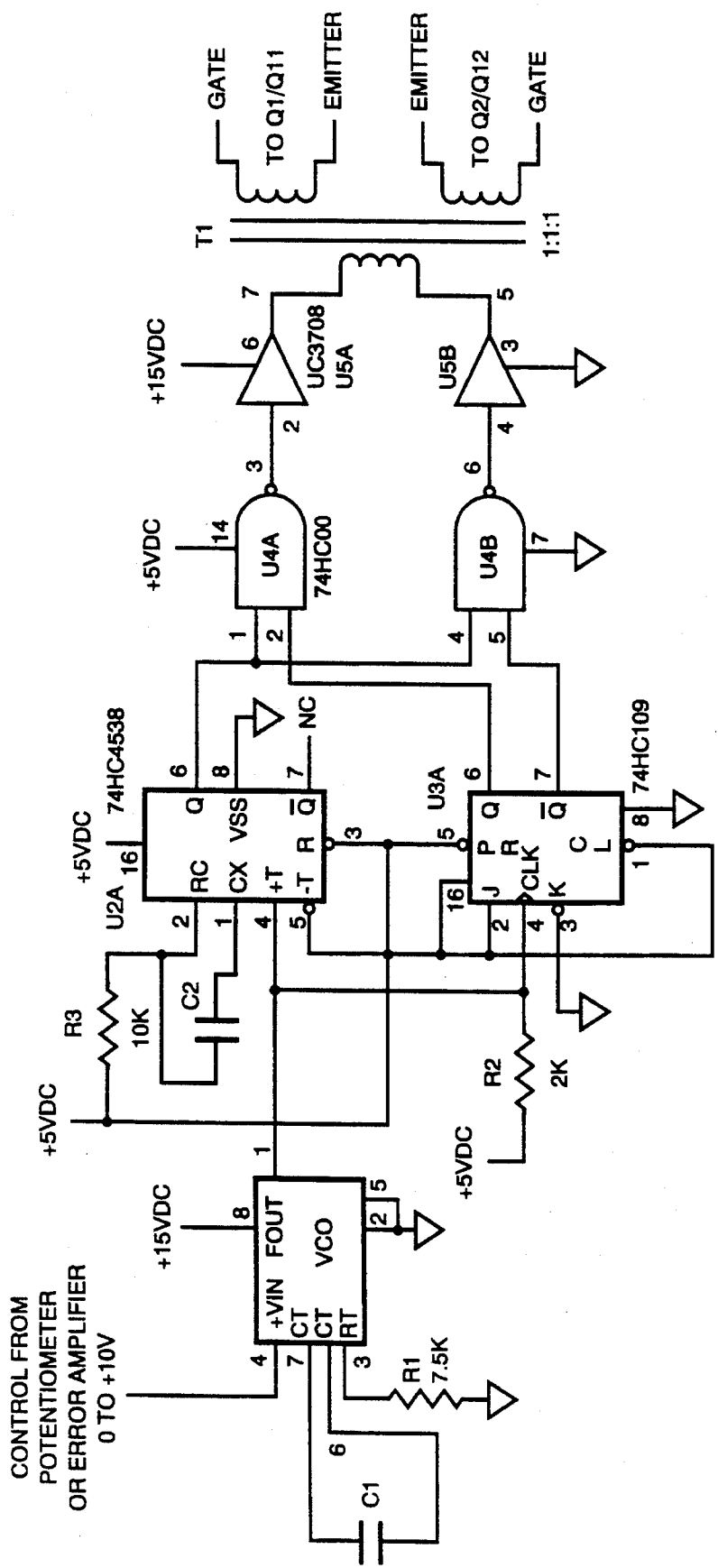
FIG. 9 is a schematic of a controlled frequency drive gate.

In this embodiment harmonic neutralizing converter 24 comprises second full-wave bridge rectifier 28 (CR11) and power switching circuit 30. Power switching circuit 30 includes transformer T11 at the output of converter 24 which isolates the output of neutralizing converter 24 from the input. As previously described, transformer T11 typically handles less than one-third of the total output power ($V_2$ is equal to or slightly greater than $V_1$). Also, T11 operates at high frequency and therefore is small in size. Power switching-circuit 30 also includes capacitor C11. Transformer T11 and capacitor C11 form a series resonant tank or series LC resonant circuit; the resonating inductance can be designed into transformer T11 as a combination of leakage and magnetizing inductance. In addition to transformer T11 and capacitor C11, power switching circuit 30 also includes IGBTs Q11 and Q12, or other appropriate semiconductor switching devices, and capacitors C12 and C13. IGBTs Q11 and Q12, which include antiparallel diodes, together with capacitors C12 and C13 form an inverter. As is well known in the art, the application of switching pulses to IGBTs Q11 and Q12 from a suitable pulse generator source as shown in FIG. 8 or FIG. 9 will deliver an AC signal of the appropriate frequency, typically with an IGBT power stage of 20 to 200 KHz, to resonant tank circuit C11, T11. FIG. 8 illustrates a fixed frequency gate drive pulse generator source wherein the value of C1 is chosen to provide the proper operating frequency of the power stage, and the value of C2 is chosen to provide the desired on-time for Q1/Q11 and Q2/Q12. FIG. 9 illustrates a controlled frequency gate drive when the values of C1 and C2 are chosen based on the same criteria as indicated above in connection with FIG. 8. Thus, power switching circuit 30 functions as a resonant DC to AC converter to provide to rectifier CR11 an AC signal that is rectified and added to the output from rectifier 22 to produce the desired charging voltage and current for battery 26.

The disclosures of copending patent applications, Attorney Dockets H-169113, H-169112 and H-169109, entitled POWER CONVERTER WITH HARMONIC NEUTRALIZATION, relating to other configurations of power converters sharing a certain commonality of architecture with the power converters of the present application are expressly incorporated herein by reference.

Figure 4:
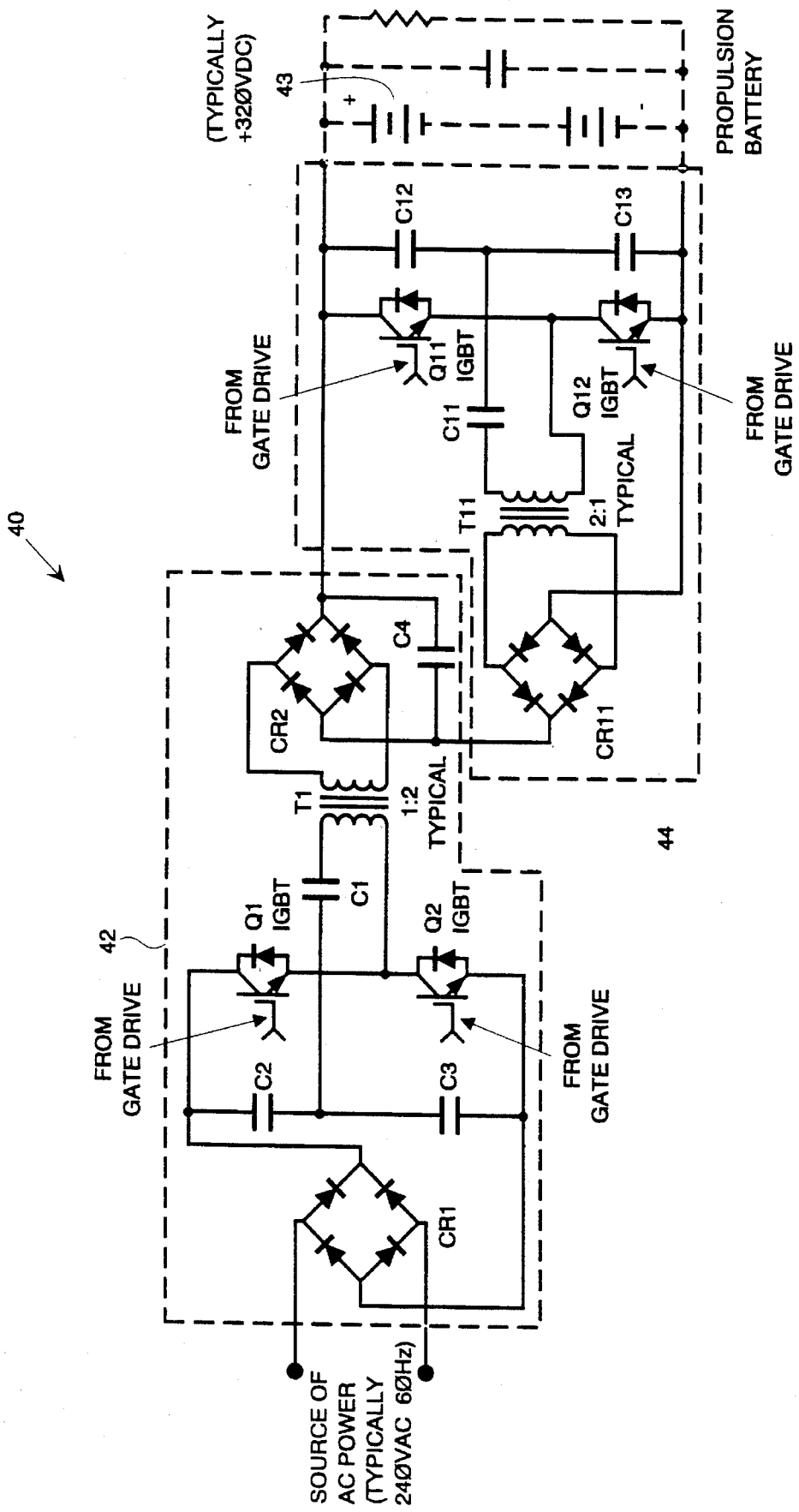
FIG. 4 is a schematic diagram of a battery charger circuit using one embodiment of the harmonic neutralizing power converter of the present invention.

FIG. 4 shows a schematic diagram of a battery charger using one embodiment of the power converter of the present invention. Input and output electromagnetic interference filters are eliminated from battery charger 40 for illustrative purposes but may be incorporated in a manner as is shown in FIG. 3. Battery charger circuit 40 includes two series resonant power converters. Specifically, primary, or link, converter 42 is electrically interconnected with secondary or neutralizing converter 44. Note that neutralizing converter 44 is the same as neutralizing converter 24 of FIGS. 1 and 3 and neutralizing converter 44 functions in the same manner as neutralizing converter 24 of FIGS. 1 and 3. The input of power switching inverter (Q11, Q12, C12, C13, C11) is connected to the load terminals of battery 43 to periodically receive energy from battery 43. Link converter 42 is not necessary for harmonic neutralization; however, link converter 42 serves other important purposes.

In addition to first rectifier CR2, link converter 42 includes link rectifier CR1 adapted to be connected to AC power. Connected to the output of link rectifier CR1 is an inverter comprising IBGTs Q1 and Q2 and capacitors C2 and C3. Link converter 42 also includes an LC resonant circuit comprising transformer T1 and resonating capacitor C1 having its input connected to an input of first rectifier CR2. The secondary of transformer T1 is connected to the input of first rectifier CR2.

Though both link converter 42 and neutralizing converter 44 may share in controlling battery charging current and in neutralizing input harmonic current, such interdependence of link converter 42 and neutralizing converter 44 is difficult to understand. It is easier to understand a situation in which link converter 42 is to control the battery charging current and neutralizing converter 44 is to neutralize input harmonic currents. In this non-sharing configuration, neutralizing converter 44 reduces EMI from link converter 42, and link converter 42 performs a variety of additional functions. Link converter 42, by means of transformer T1, galvanically isolates link converter 42 and transforms the input source voltage to the battery voltage ratio. Link converter 42 also reduces EMI from neutralizing converter 44 and, when T1 is a special induction coupled device, permits. induction battery charging. Neutralizing converter 44 may also provide power switching functions for other power subsystems. For example, if used in a purely electric or hybrid electric vehicle, neutralizing converter 44 may provide the power switching functions for the vehicle's auxiliary power supply, heated windows power supply, and heating, ventilation and air-conditioning power supply.

As discussed in association with the embodiment of FIG. 1, it is expected that the input voltage to battery charging circuit 40, equivalent to the AC into rectifier bridge CR2 of link converter 42, has a voltage source characteristic, i.e., the input voltage has low source impedance. Thus, the input is to be a pure sinusoid at 60 Hz or 50 Hz, for example. However, link converter 42 in the embodiment of FIG. 4 is a series resonant converter. A high frequency of operation is involved in the operation of link converter 42, and, link converter 42 can be designed to have either a current source characteristic or a voltage source characteristic, more typically the former. Thus, rectifier bridge CR2 of link converter 42, together with capacitor C4, demodulates and filters the high frequency provided by the other components of link converter 42. The output of link converter 42 is therefore a full-wave rectified, quasi-sinusoid at the frequency of the source (60 Hz or 50 Hz, for example). To the extent that the operating load line of neutralizing converter 44, as seen across capacitor C4 of link converter 42, appears as a pure linear resistance as previously discussed herein, harmonic neutralization of battery charging circuit 40 is complete. Similarly to the embodiment of FIG. 3, the output voltage of neutralizing converter 44 at rectifier CR11 is added to the output voltage of link converter 42 at rectifier CR2 to produce the desired voltage and current for charging battery 43.

It will be appreciated by those of skill in the art that link converter 42 and neutralizing converter 44 of battery charging circuit 40 may be replaced with PWM converters. PWM converters have a voltage source characteristic, i.e., at a fixed pulse width and frequency, the output voltage of a PWM converter is directly proportional to the input voltage and independent of the output current. To neutralize harmonics, the output load line from a PWM converter can only be made suitable by modulating its switching. Thus, PWM converters could be used in the embodiment of FIG. 4 if their switching is so modulated. However, because of the numerous inherent disadvantage of a PWM converter, the present invention contemplates the use of resonant converters for achieving harmonic neutralization.

A resonant converter, as previously discussed, tends to have a current source characteristic, i.e., at a fixed frequency and below its cutoff voltage the output current of a resonant converter is directly proportional to the input voltage and is independent of the output voltage. The output load line of a resonant converter generally can only be made suitable by modulating its operating frequency. An ordinary series resonant converter, such as neutralizing converter 44 of FIG. 4, usually does not neutralize harmonics well unless its operating frequency is controlled. Neutralizing converter 44 may be controlled by means well known in the art by adjusting its operating frequency. In this embodiment, its operating frequency is controlled, by means of a gate drive circuit such as that of FIG. 9, to cause the output to follow a load line similar to that of FIGS. 2A–2B. As presented in FIGS. 5–7 herein, however, it is possible to achieve harmonic neutralization without adjusting the operating frequency of the neutralizing converter, i.e., with the converter operating at a fixed operating frequency.

Referring now to FIG. 5, there is shown a second embodiment of a neutralizing converter according to the present invention used in a battery charging circuit when operation at a fixed frequency is desired. In this embodiment, link converter 42 is the same as that discussed with regard to FIG. 4. Neutralizing converter 46 includes the components of neutralizing converter 44 of the embodiment of FIG. 4 as well as the additional components of full-wave bridge rectifier CR11a, transformer T11a and capacitor C11a, which collectively comprise second output stage 48. Third rectifier CR11a is connected in parallel with second rectifier CR11 of harmonic neutralizing converter 46. The second LC resonant circuit, in this embodiment comprising transformer T11a in series with resonating capacitor C11a, is connected to second rectifier CR11 and is in parallel with the first LC resonant circuit comprising transformer T11 in series with resonating capacitor C11. Neutralizing converter 46 of FIG. 5 is an improvement over neutralizing converter 44 of FIG. 4 as second output stage 48 of neutralizing converter 46 creates a stepped approximation of the ideal load line of neutralizing converter 46. At one extreme operating point where the output current of neutralizing converter 46 is at its maximum and the output voltage of neutralizing converter 46 is at a minimum, both tank circuits (T11/C11 and T11a/C11a), through their respective output bridges CR11 and CR11a, provide approximately equal current. At the other extreme operating point where the output voltage of neutralizing converter 46 is a maximum and the output current is nearly zero, the T11/C11 tank provides little current through CR11 and the tank T11a/C11a provides no current through CR11a. At the mid-point on the load line, the output current of neutralizing converter 46 should be one-half (½) the maximum output current. To accomplish this objective, T11 has a primary to secondary turns ratio of 1 to 2 while transformer T11a has a 1 to 1 turns ratio.

Figure 10:
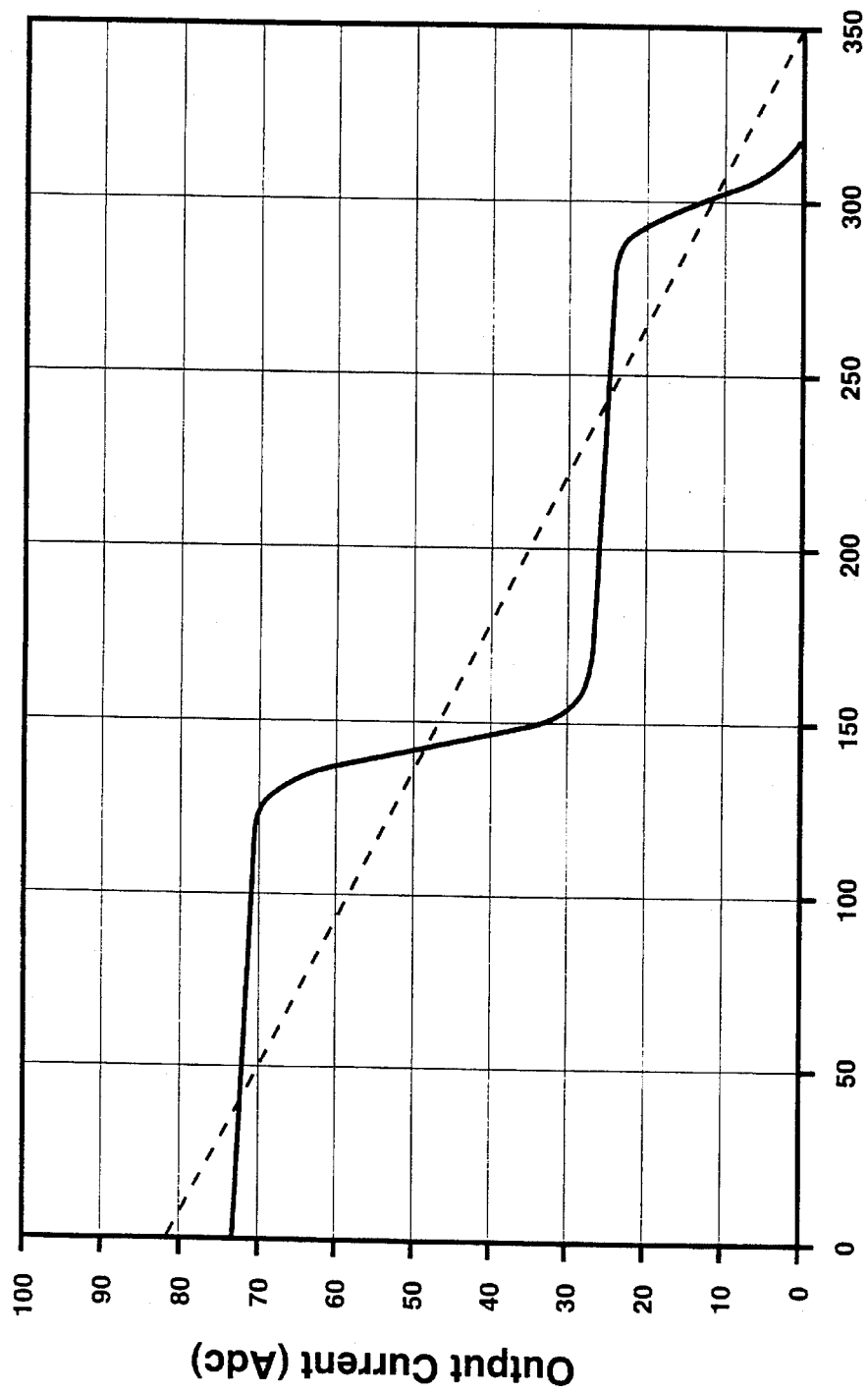
FIG. 10 is a diagrammatic representation of a two step load line.
Figure 11:
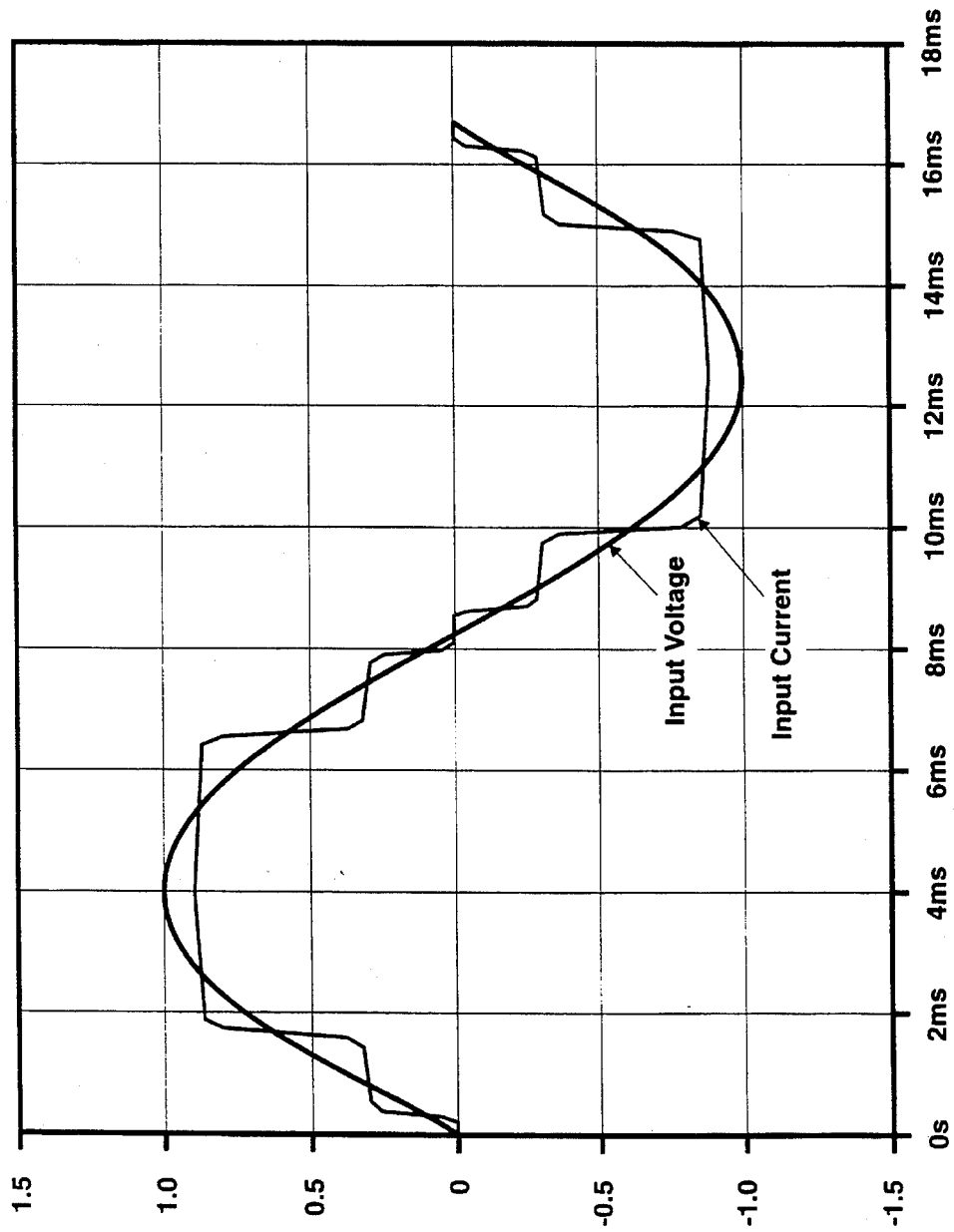
FIG. 11 is a graphical representation of harmonic neutralization with a two step load line.
Figure 12:
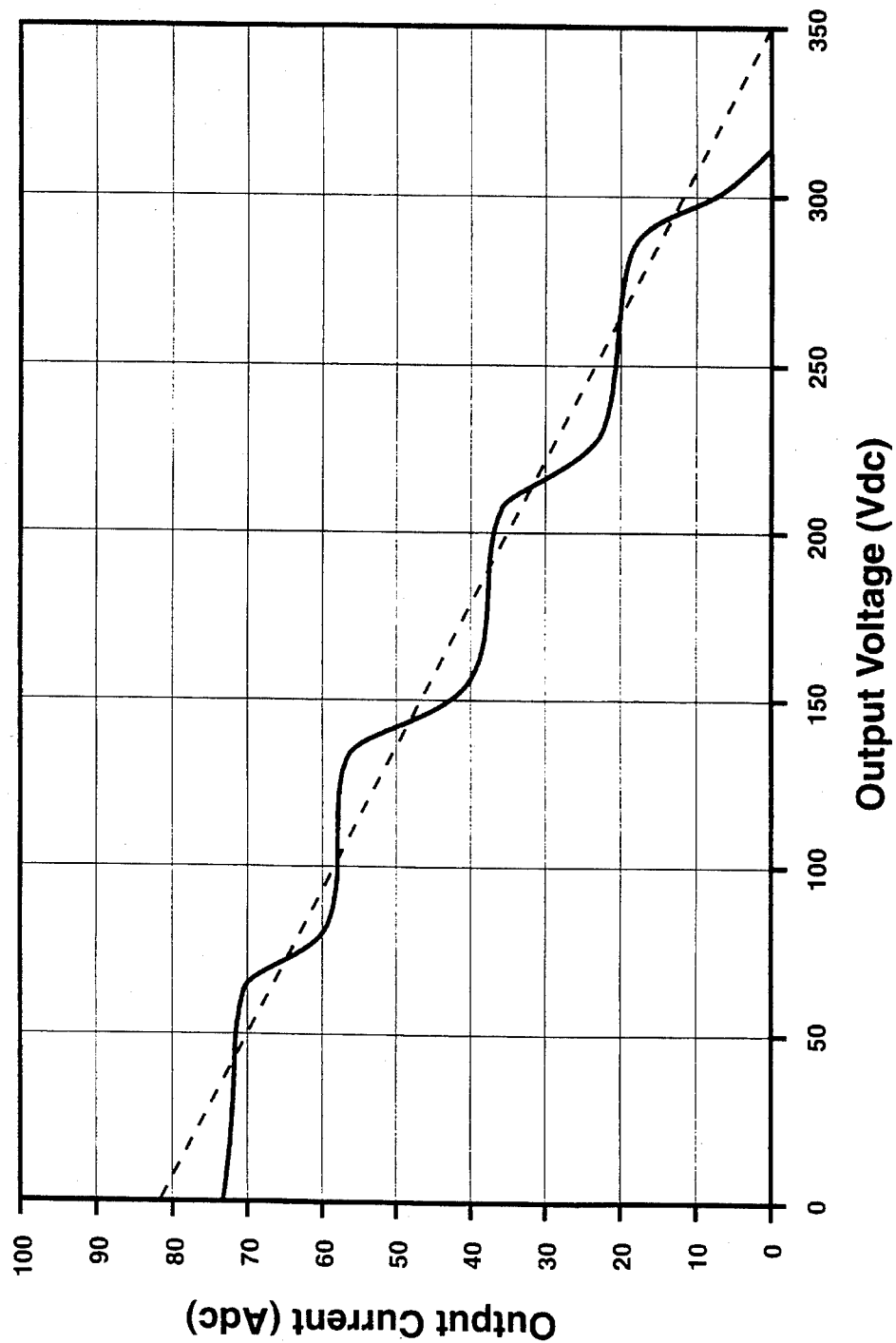
FIG. 12 is a graphical representation of a four step load line.
Figure 13:
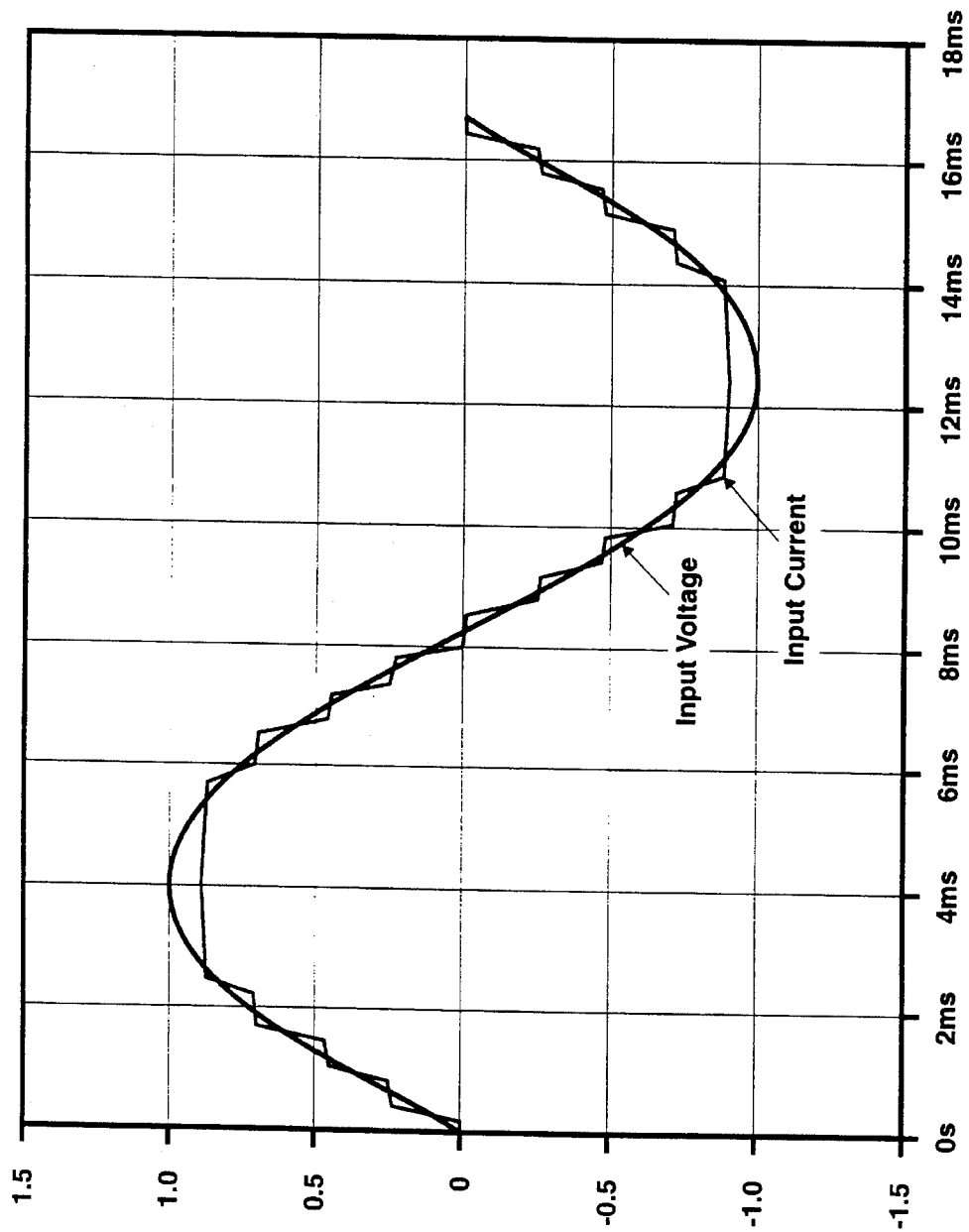
FIG. 13 is a graphical representation of harmonic neutralization with a four step load line.

As discussed above, the frequency of the gate drive can be controlled to cause the output of the converter to follow a straight line (FIGS. 2A and 2B). In the embodiment of FIG. 5, a fixed frequency drives IGBTs Q1, Q2, Q11 and Q12, which means that a straight load line can only be approximated by two steps produced by the two stages of converter 46 as illustrated in FIG. 10. The two step load line achieves the harmonic neutralization illustrated in FIG. 11. Despite the fact that the load line of neutralizing converter 46 is approximated to a straight line by only two steps in the embodiment of FIG. 5, it has been demonstrated that the steps of the approximation have favorable slopes and that the mid-point transition is fairly smooth. Less than 10% total harmonic distortion occurs and a power factor greater than 0.99 is achieved with the embodiment of FIG. 5. For example, when the input voltage is 120 volts AC (60 Hz) with a current of 6 amps, the operating frequency of link converter 42 is 75 KHz and the operating frequency of neutralizing converter 46 is 55 KHz, distortion of the voltage source has been demonstrated to be as little as 2%. In this example, the efficiency of the circuit is 81% with an input power, $P_{in}$, of 724.4 W and an output power, $P_{out}$, of 584.6 W. The addition of more stages to converter 46 will produce a smoother approximation of a linear load line as illustrated in the four stage load line of FIG. 12 and the harmonic neutralization waveform of FIG. 13.

FIG. 6 shows a second embodiment of the neutralizing converter of the present invention used in a battery charging circuit. Link converter 42 is as previously described in association with the embodiment of FIG. 4. Neutralizing converter 50 comprises the same components as those of neutralizing converter 44 in FIG. 4 and also includes full-wave bridge rectifier CR11a and transformer T11a, referred to herein as bootstrapping circuit 52. The embodiment of FIG. 6 differs from that of FIG. 5 in that neutralizing converter 50 comprises only one tank circuit, i.e., there is only one resonating capacitor, C11, whereas the neutralizing converter 46 of FIG. 5 comprises two tank circuits, i.e., there are two resonating capacitors, namely C11 and C11a. In the embodiment of FIG. 6, the resonating inductance is therefore the parallel combination of the leakage inductances of T11 and T11A.

Bootstrapping circuit 52, as previously stated, includes third rectifier CR11a and transformer T11a. Third rectifier CR11a includes an input connected to the LC resonant circuit (T11 and C11) and an output connected to the input of the power switching inverter (Q11, Q12, C12, C13). Harmonic neutralization by neutralizing converter 50 is achieved by bootstrapping a small amount of current back to the input of neutralizing converter 50 over line 51. Specifically, at one extreme operating point wherein the output current of neutralizing converter 50 is at a maximum and the output voltage is at a minimum, the output circuit comprising CR11 and T11 provides the current. At the other extreme operating point where the output voltage of neutralizing converter 50 is at a maximum and the output current is nearly zero, the output of CR11 provides little current and bootstrapping circuit 52 provides approximately 40% of the maximum current achieved by CR11 output at the other extreme operating point. This latter extreme operating point is therefore the point at which the highest value of output current is supplied by bootstrapping circuit 52. Between these two extremes, the load line is quite linear. Further, as desired, at the mid-point of the output voltage, the output current of CR11 is close to 50% of its maximum value.

It will be appreciated by those of skill in the art that it is possible to simplify neutralizing converter 50 by combining transformers T11 and T11a into one transformer. Also, for neutralizing converter 50 to function properly, i.e., for it to achieve harmonic neutralization, it will be appreciated that it is necessary for a specific value of leakage inductance between the primary and secondary which drives CR11 to be utilized. It is also necessary to design for the leakage between the primary and other secondary, whether the "other" secondary be of T11a, as shown, or of T11 if T11 and T11a are combined. Finally, the leakage inductance between the two secondaries should be made as large as possible.

It will also be appreciated that both embodiments of the neutralizing converter of the present invention shown in FIGS. 5–6 require no frequency control to result in effective harmonic neutralization. Because no frequency control is required, and, specifically, because no frequency control is required, component counts are kept to a minimum, thereby minimizing the cost of manufacturing the neutralizing converter. Low component count also minimizes the potential degradation of circuit reliability. Finally, if multiple outputs are to be supported by such a neutralizing converter, a minimal number of high-power components are required when using the neutralizing converter of the present invention. If, on the other hand, the neutralizing converter required control of frequency rather than operating at a fixed frequency, high-power components would be required to support each output of a multiple output application. High power components are costly and also are of significant size and weight to make it difficult to be implemented in some environments wherein the volume and/or weight of the circuit is of concern. Thus, the absence of the requirement of control of the neutralizing converter of FIGS. 5–6 is advantageous in avoiding complexities introduced with such control as well as the specific shortcomings of frequency-controlled resonant converters.

Referring now to FIG. 7, there is shown a third embodiment of the neutralizing converter of the present invention employed in a battery charging circuit. Again, link converter 42 is the same as discussed in association with FIGS. 4–6. Like the embodiment of FIG. 4 and unlike the embodiments of FIGS. 5–6, neutralizing converter 54 of FIG. 7 requires control to result in harmonic neutralization. As is described hereinafter, however, such control is achieved without adjusting the operating frequency of neutralizing converter 54. Neutralizing converter 54 is operated at a fixed frequency.

Neutralizing converter 54 of FIG. 7 comprises the same components as neutralizing converter 44 of FIG. 4, except that transformer T11 in FIG. 7 is the controlled-K resonating transformer disclosed in copending U.S. patent application Ser. No. 08/316,969 filed Oct. 3, 1994, which is incorporated herein by reference. Summarily, transformer T11 of FIG. 7, the controlled-K resonating transformer, is specifically designed for use in a resonant converter having a current source characteristic. T11 comprises primary and secondary windings which are loosely coupled, and a control winding. Provision of DC control current to the control winding results in saturation of the core of the transformer. When control current is applied through controlled DC current source 56, the effective coupling (K) of the transformer is changed. Minimal switching loss occurs when the operating frequency is less than one-half of the resonating frequency of the transformer. Also, only one power stage is required to support multiple outputs using the controlled-K resonating transformer.

Though the neutralizing converter of the embodiment of FIG. 7 requires control of current supplied to the transformer's control winding, as explained in the copending U.S. patent application Ser. No. 08/316,969 filed Oct. 3, 1994, when used in a resonant converter, the controlled-K resonating converter provides several advantages over the prior art wherein the operating frequency is controlled.

It will be appreciated by those of skill in the art that the use of controlled resonant converters as in the embodiments of FIG. 4 through FIG. 7 provide an advantage over the use of PWM converters in addition to the general advantages described herein. For reasons immediately following, the use of controlled resonant converters allows one to monitor the output voltage of the neutralizing converter for the purpose of controlling harmonic neutralization. With PWM converters, the output current is sensed. Use of the output voltage may be less costly than the current control used in PWM converters.

A resonant converter can have a current source characteristic. The output current of a resonant converter can be inherently proportional to the input voltage of the resonant converter and can be relatively independent of the output voltage of the resonant converter. If the output voltage of the neutralizing converter is controlled to produce a rectified sine wave of voltage across capacitor C4 of the neutralizing converter (which is scaled but otherwise is like the voltage at the output of input rectifier bridge CR1), the input current (before rectification) to the link converter is a sine wave. The link converter tends to reproduce its input voltage waveform with its output current waveform. Therefore, if the link converter is regulated, by means of control, to have a rectified sine wave of output voltage, the input current to the link converter will tend to be a rectified sine wave.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An AC to DC power converter comprising:

a first rectifier having an input to receive AC input power and having an output;

load output terminals for delivering DC power to a load, a harmonic neutralizing converter comprising a power switching inverter having an input connected to the output of said first rectifier, said inverter including an LC resonant circuit and an output, said harmonic neutralizing converter further comprising a second rectifier having an input connected to the output of said inverter and having an output connected in a voltage additive relationship to the output of said first rectifier, the added output of said rectifiers connected to said load terminals whereby the output voltage on the load terminals substantially equals the added output voltage of said rectifiers.

2. The power converter of claim 1 wherein said LC resonant circuit is a series LC resonant circuit.

3. The power converter of claim 2 wherein the inductance in said series resonant circuit is provided by a transformer having its secondary connected to said second rectifier.

4. The power converter of claim 1 wherein said inverter includes switching means for converting DC input from said first rectifier to an AC output through said LC resonant circuit.

5. The power converter of claim 4 wherein said switching means is driven by a controlled variable frequency source.

6. The power converter of claim 4 wherein said switching means is driven by a constant frequency source.

7. The power converter of claim 1 wherein said load comprises a battery connected to said load terminals, and the input of said power switching inverter is connected to said load terminals to periodically receive energy from said battery.

8. The power converter of claim 1 wherein said resonant circuit comprises a resonating capacitor and a controlled transformer such that the output of the inverter is controlled by controlling said transformer.

9. The power converter of claim 8 wherein said transformer is a controlled-K transformer.

10. The power converter of claim 1 further comprising at least one additional output stage for creating a stepped approximation of a linear voltage-current load line of said power converter, said output stage comprising:

a third rectifier connected in parallel with said second rectifier, and a second resonant LC circuit connected to said second rectifier and in parallel with the first resonant LC circuit.

11. The power converter of claim 10 wherein each said LC resonant circuit is a series LC resonant circuit comprising a capacitor in series with a transformer connected to the respective said second or third rectifier.

12. The power converter of claim 10 wherein said inverter includes switching means for converting DC input from said first rectifier to an AC output through each of said resonant circuits, and wherein said switching means is driven by a constant frequency source.

13. The power converter of claim 1 further comprising a bootstrapping circuit for approximating a linear voltage-current load line of said power converter, said bootstrapping circuit comprising a third rectifier having an input connected to said LC resonant circuit and an output connected back to the input of said power switching inverter, whereby when the output current of said power converter is a maximum and the output voltage of said power converter is a minimum, said resonant circuit provides current and said bootstrapping circuit provides substantially no current, and when the output voltage of said power converter is a maximum and the output current of said power converter is a minimum, said bootstrapping circuit provides the current and said resonant circuit provides substantially no current.

14. The power converter of claim 1 and further comprising a link resonant converter that includes said first rectifier, said link resonant converter including: a link rectifier adapted to be connected to a source of AC power, a link inverter having its connected to an output of said link rectifier, said link converter including an LC resonant circuit and having its output connected to an input of said first rectifier.

15. The power converter of claim 14 wherein the inductance in the LC resonant circuit of said link inverter is provided by a transformer having its secondary connected to the input of said first rectifier.

16. The power converter of claim 14 wherein said load comprises a battery connected to said load terminals, and the input of the power switching inverter is connected to said load terminals to periodically receive energy from said battery.

17. The power converter of claim 14 further comprising an additional output stage for creating a stepped approximation of a linear voltage-current load line of said power converter, said output stage comprising:

a fourth rectifier connected in parallel with said second rectifier, and a third resonant circuit connected to said fourth rectifier and in parallel with the resonant circuit of said power switching inverter.

18. The power converter of claim 14 further comprising a bootstrapping circuit for approximating a linear voltage-current load line of said power converter, said bootstrapping circuit comprising a fourth rectifier having an input connected to said LC resonant circuit of said power switching inverter and an output connected back to the input of said power switching inverter, whereby when the output current of said power converter is a maximum and the output voltage of said power converter is a minimum, the resonant circuit of said power switching inverter provides current and said bootstrapping circuit provides substantially no current, and when the output voltage of said power converter is a maximum and the output current of said power converter is a minimum, said bootstrapping circuit provides the current and the resonant circuit of said power switching inverter provides substantially no current.

* * * * *